United States Patent [19]
Peachey et al.

[11] Patent Number: 5,738,708
[45] Date of Patent: Apr. 14, 1998

[54] COMPOSITE METAL MEMBRANE

[75] Inventors: Nathaniel M. Peachey, Espanola; Robert C. Dye, Los Alamos; Ronny C. Snow, Los Alamos; Stephan A. Birdsell, Los Alamos, all of N. Mex.

[73] Assignee: The Regents of the University of California Office of Technology Transfer, Alameda, Calif.

[21] Appl. No.: 484,801

[22] Filed: Jun. 7, 1995

[51] Int. Cl.$^6$ .............................. B01D 53/22; B01D 71/02
[52] U.S. Cl. ...................... 95/56; 96/11; 427/250; 427/405; 427/534; 428/548; 428/662; 428/663; 428/938
[58] Field of Search ................. 95/55, 56; 96/4, 96/11; 427/250, 405, 532–534, 566, 597; 428/548, 606, 607, 615, 662, 663, 670, 938

[56] References Cited

U.S. PATENT DOCUMENTS

| | | | |
|---|---|---|---|
| 2,958,391 | 11/1960 | deRosset | 96/11 X |
| 3,241,298 | 3/1966 | Pierce | 96/11 X |
| 3,350,846 | 11/1967 | Makrides et al. | 55/16 |
| 3,413,777 | 12/1968 | Langley et al. | 96/11 |
| 3,447,288 | 6/1969 | Juda et al. | 96/11 |
| 4,147,573 | 4/1979 | Morimoto | 427/534 X |
| 4,468,235 | 8/1984 | Hill | 55/16 |
| 4,828,870 | 5/1989 | Ando et al. | 427/533 X |
| 5,017,439 | 5/1991 | Brar et al. | 427/534 X |
| 5,069,748 | 12/1991 | Przybysz | 427/534 X |
| 5,082,359 | 1/1992 | Kirkpatrick | 427/534 X |
| 5,149,420 | 9/1992 | Buxbaum et al. | 205/219 |
| 5,205,841 | 4/1993 | Vaiman | 96/11 X |
| 5,215,729 | 6/1993 | Buxbaum et al. | 423/248 |
| 5,270,081 | 12/1993 | Manier et al. | 427/534 |
| 5,304,405 | 4/1994 | Kobayashi et al. | 427/534 |
| 5,393,325 | 2/1995 | Edlund | 95/56 |

FOREIGN PATENT DOCUMENTS

| | | | |
|---|---|---|---|
| 299825 A5 | 5/1992 | Germany | 427/534 |
| 53-043153 | 11/1978 | Japan | 95/56 |
| 59-177117 | 10/1984 | Japan | 95/56 |
| 1818357 | 5/1993 | U.S.S.R. | 427/534 |
| 1292025 | 10/1972 | United Kingdom | 95/56 |
| WO94/06542 | 3/1994 | WIPO | 96/11 |

OTHER PUBLICATIONS

R.E. Buxbaum et al., Journal of Membrane Science, 85, 1993 pp. 29–38.
MDH-1000: A Hydrogen Purification System, 1997 R&D 100 Joint Entry.

*Primary Examiner*—Robert Spitzer
*Attorney, Agent, or Firm*—Bruce H. Cottrell

[57] ABSTRACT

A composite metal membrane including a first metal layer of Group IVB metals or Group VB metals, the first metal layer sandwiched between two layers of an oriented metal of palladium, platinum or alloys thereof is provided together with a process for the recovery of hydrogen from a gaseous mixture including contacting a hydrogen-containing gaseous mixture with a first side of a nonporous composite metal membrane including a first metal of Group IVB metals or Group VB metals, the first metal layer sandwiched between two layers of an oriented metal of palladium, platinum or alloys thereof, and, separating hydrogen from a second side of the nonporous composite metal membrane.

14 Claims, 4 Drawing Sheets

5,738,708

COMPOSITE METAL MEMBRANE

This invention was made with government support under Contract No. W-7405-ENG-36 awarded by the U.S. Department of Energy. The government has certain rights in the invention.

FIELD OF THE INVENTION

The present invention relates to a hydrogen-permeable membrane and in particular to a composite metal membrane for purification of hydrogen or its separation from a mixture of gases by diffusion through the membrane. Additionally, this invention relates to a method of separating hydrogen in a substantially pure form by use of the composite metal membrane which is permeable only to hydrogen.

BACKGROUND OF THE INVENTION

There are a variety of needs for essentially pure hydrogen. Included among these are fuel cells, membrane reactors and fuel reforming operations. As a result there is a strong interest in economical methods for hydrogen separation.

Composite metal membranes are known for the separation of hydrogen from gaseous mixtures. For example, U.S. Pat. No. 3,350,846 (Makrides et al.) describes separation of hydrogen by permeation through metal membranes including a Group VB metal sandwiched between two layers of palladium. In U.S. Pat. No. 5,149,420, Buxbaum et al. describe a method for plating palladium onto Group IVB or VB metals to form articles useful for hydrogen separation. Also, U.S. Pat. No. 5,393,325 (Edlund) describes a composite hydrogen separation metal membrane. Despite all of the previous work in the development of composite metal membranes for hydrogen separation, improvements have been continually sought to improve efficiency.

It is an object of this invention to provide a composite metal membrane capable of separating hydrogen or its isotopes by selective diffusion through the membrane and more preferably essentially pure hydrogen or its isotopes.

Another object of the present invention is to provide a process for the selective separation or purification of hydrogen by use of a composite metal membrane.

Still another object of the present invention is a process of forming a composite metal membrane for subsequent separation of essentially pure hydrogen by selective diffusion through the membrane.

SUMMARY OF THE INVENTION

To achieve the foregoing and other objects, and in accordance with the purposes of the present invention, as embodied and broadly described herein, a composite metal membrane is provided including a layer of a Group IVB or Group VB metal sandwiched between two layers of an oriented metal selected from the group consisting of palladium, platinum and alloys thereof.

The present invention further provides a process for the recovery of hydrogen from a gaseous mixture including contacting a hydrogen-containing gaseous mixture with a first side of a nonporous composite metal membrane including a layer of a Group IVB or Group VB metal sandwiched between two layers of an oriented metal selected from the group consisting of palladium, platinum and alloys thereof, and, separating hydrogen from a second side of said nonporous composite metal membrane.

The present invention still further provides a process of forming a composite metal membrane including ion milling an oriented metal film selected from the group consisting of Group IVB metals and Group VB metals to remove surface oxides and surface imperfections from the oriented metal film, and, depositing layers of an oriented metal selected from the group consisting of palladium, platinum and alloys thereof upon the ion milled surfaces of the Group IVB or Group VB metal film.

DETAILED DESCRIPTION

Figure 1:
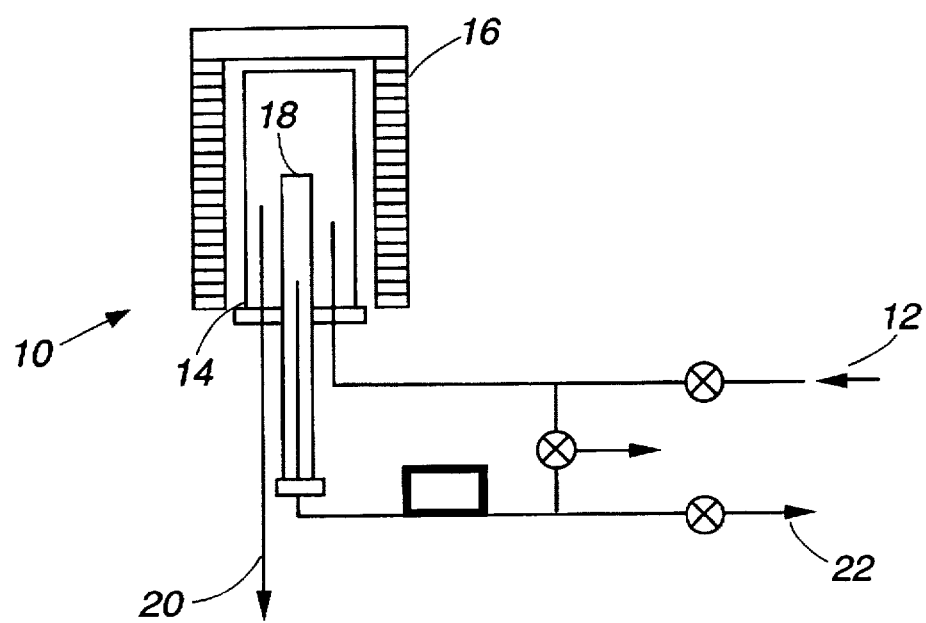
FIG. 1 shows a schematic diagram of a gas separation apparatus used with the present invention.

The present invention is concerned with composite metal membranes for hydrogen separation. In one aspect of the present invention, the central or core metal layer of the composite structure, such as tantalum, is cleaned by ion beam milling to remove any surface oxidation or other surface imperfections to provide an improved surface for deposition of a catalytic metal layer on the central metal surfaces. Another aspect of the present invention is the deposition of the catalytic metal layers under conditions effective to provide oriented layers of the catalytic metal. One suitable process of depositing oriented metal layers is by vapor deposition of the catalytic metal.

The composite membrane of the present invention includes a core or central metal layer sandwiched between layers of a catalytic metal. The central or core metal can generally be of Group IVB metals and Group VB metals such as vanadium, niobium, tantalum, titanium, mad zirconium. The central metal of the membrane may also be of a metal from Groups IB, IIIB, VIIB or VIIIB of the periodic table. Preferably, the central or core metal is vanadium, niobium or tantalum. The central or core metal can also be an alloy of, e.g., one or more Group IVB or Group VB metals or one or more Group IVB or Group VB metals and other metals such as gold, silver and copper. Preferably, the central or core metal has a defined orientation or crystal structure, e.g., a (100) orientation.

In one aspect of forming the composite membrane of the present invention, the central metal film is cleaned by an ion milling process under vacuum. The ion milling process can be conducted in a suitable vacuum chamber evacuated to at least about $10^{-3}$ Torr, preferably at least about $10^{-6}$ Torr. The ion used for the ion milling can be, e.g., argon, neon, or helium.

Catalytic metal layers are then deposited upon the surfaces of the central metal film such that a three layer sandwich is formed with the central metal film coated on its oppositely situated surfaces with a layer of the catalyic metal. The catalytic metal can generally be selected from among palladium and platinum. Alloys of platinum and palladium may also be employed wherein such alloys further include one or more other metal such as silver, gold, copper, yttrium, and cerium in amounts of from about 1 to about 50 percent by weight based on the total weight of the metals in the alloy. Alloys may allow the composite metal membrane to separate hydrogen from a gaseous mixture at lower temperatures than with the use of pure palladium or platinum metal.

The catalytic metal layers can be deposited, e.g., by pulsed laser deposition or by methods such as evaporation including coevaporation and e-beam evaporation, and sputtering including magnetron sputtering, ion beam sputtering and ion assisted sputtering. Generally, e-beam evaporation and ion beam sputtering are preferred with e-beam evaporation being more preferred for the deposition as it is believed that such a deposition process leads to less embrittlement of the central metal.

The deposition process of the present invention is conducted under vacuum and preferably is conducted within the same vacuum chamber as that wherein the central metal is cleaned. Preferably, the deposition is carried out immediately after the cleaning or ion milling without removal of the central metal film from the vacuum environment.

The deposition process results in the deposition of oriented layers of the catalytic metal upon the central metal film. By "oriented" is meant that the deposited metal is not amorphous, rather it has a defined crystallinity which can be observed as a resultant peak in a x-ray diffraction pattern of the material. One beneficial orientation for subsequent hydrogen separation is that commonly referred to as a (111) orientation. Other orientations such as a (110) orientation may be achieved by use of ion beam assisted deposition of the metal. Where the central metal in not oriented, ion beam assisted deposition of the catalytic metal layers may be required to obtain the desired orientation.

For any required ion beam assisted deposition, a dual-ion-beam sputtering system similar to that described by Iijima et al., IEEE Trans. Appl. Super., vol.3, no.1, pp.1510 (1993) can be used. Generally, the substrate normal to ion-assist beam angle is 54.7°±3°.

As the catalytic metal layers generally is the limiting factor in hydrogen permeation through the composite metal membrane, the central metal layer, e.g., tantalum, can be made thicker so as to increase the structural stability of the composite metal membrane without reducing hydrogen gas flux. Alternatively, the thickness of the metal coatings, e.g., the palladium layers, can be reduced to increase hydrogen flux. Generally, the central metal layer can be from about 10 microns to about 250 microns although a thicker layer may be used if desired for structural stability. The metal coatings layer can generally be from about 0.1 micron to about 25 microns, preferably from about 0.5 micron to about 1 micron in thickness.

An additional intermediate or buffer layer may be added between the central metal and each of the catalytic metal layers. Such a buffer layer may reduce interdiffusion between the catalytic metal and the central metal at the operating temperatures of the composite metal membrane. Among the materials that may serve as the buffer layer are included oxide materials such as silicon dioxide ($SiO_2$), aluminum oxide ($Al_2O_3$), molybdenum dioxide ($MoO_2$), tungsten oxide ($WO_2$), lanthanum oxide ($La_2O_3$), and yttrium oxide ($Y_2O_3$), and sulfide materials such as molybdenum disulfide ($MoS_2$), tungsten sulfide ($WS_2$), and vanadium sulfide ($V_2S_5$).

Preferably, any additional buffer layer is deposited in the same manner as the catalytic metal layer and is deposited under vacuum in sequence with the cleaning of the central metal and deposition of the catalytic metal layers. Preferably, the buffer layers are deposited with an orientation having suitable structural compatibility with the subsequent catalytic metal layers.

In the operation of the composite metal membrane of the present invention to separate hydrogen, a hydrogen-containing gas stream is contacted with one side of the membrane whereat at least some of the hydrogen passes through the membrane and is separated as a permeate stream of hydrogen, preferably essentially pure hydrogen. By the term "essentially pure" is meant that the molar amounts of hydrogen in the permeate stream are at least three orders of magnitude greater than molar amounts of any other gas collected in the permeate stream. A sweep gas, i.e., any other gas than hydrogen, may optionally be employed on the permeate side of the composite metal membrane where essentially pure hydrogen is not sought.

The membrane and process of the present invention can be generally operated at temperatures of from about 80° C. to about 700° C., preferably from about 200° C. to about 400° C. and at pressures from about a few millitorr to about 10 atmospheres or more.

The present invention is more particularly described in the following examples which are intended as illustrative only, since numerous modifications and variations will be apparent to those skilled in the art.

EXAMPLE 1

Tantalum foils (from Goodfellow Metals, Berwyn, Pa.) were cleaned in a vacuum chamber using bombardment of argon ions. The initial foil thickness was 12.5 μm and approximately 500Å of material was removed from each surface. Without breaking the vacuum, the cleaned foils were then coated (on both sides) with 1 μm of 99.9% pure palladium using metal evaporation. The tantalum foils were kept at ambient temperature during both the ion milling and metal deposition processes. The resultant composite metal membranes were then tested for hydrogen permeability.

The test system for evaluating the characteristics of the composite metal membranes is shown in FIG. 1. Feed gas stream 12 enters apparatus 10 into chamber 14. The chamber is surrounded by heater 16. Composite metal membrane 18 separates the feed gas side of the membrane from the permeate side of the membrane and feed gas passes out at feed gas exit 20 as permeate gas 22 is recovered for analysis. The composite metal membranes were mounted in a conflat flange and pressed between two gaskets exposing an area of about 2 cm². A porous brass support was used, preventing the applied pressure from rupturing the composite metal membranes. Prior to testing, the mounted membranes were held in a vacuum at 400° C. for at least 24 hours. While this did not appear to change the hydrogen flux significantly, it did increase the longevity of the membranes. A 50:50 percent by volume mixture of argon and hydrogen was used as the test gas. A residual gas analyzer was used to monitor the gas composition in the permeate stream. Leaks could be detected by observing the presence of significant argon gas content. A seal was considered to be leak-free if the argon signal from the gas analyzer was 3 to 4 orders of magnitude less than the hydrogen. No sweep gas was used on the permeate side and the hydrogen fluxes were measured using appropriately sized mass flow meters (from MKS Instruments). The mass flow meters were calibrated to nitrogen gas and the hydrogen fluxes maintained below half of the metering capacity as the manufacturer of the gas flow meter confirmed that in this regime, the scaling factor is essentially unity. The feed gas pressure for the measurements was maintained between 789 and 793 Torr, while the permeate pressure remained below 45 Torr. Since the feed gas was comprised of only 50 percent hydrogen, the hydrogen pressure differential between feed and permeate was about 355 Torr.

Temperature-dependent permeation studies were also performed on the composite metal membranes. Lag time determinations were made and an Arrhenius plot used to obtain both the pre-exponential and the activation energies in the diffusion equation $$D = D_0 \exp(-E_a/RT).$$

Figure 2:
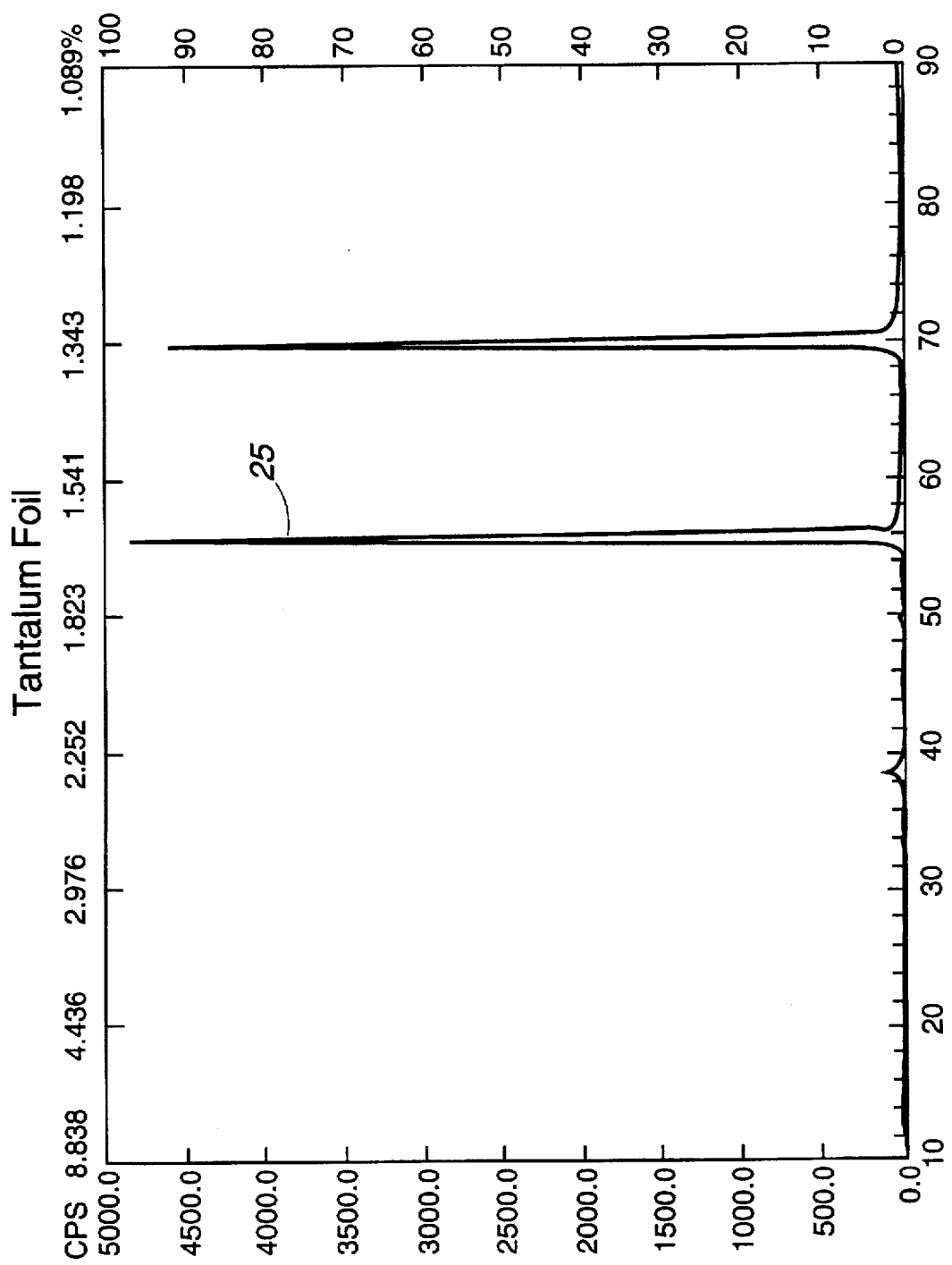
FIG. 2 shows a x-ray diffraction pattern of a tantalum foil used in accordance with the present invention.
Figure 3:
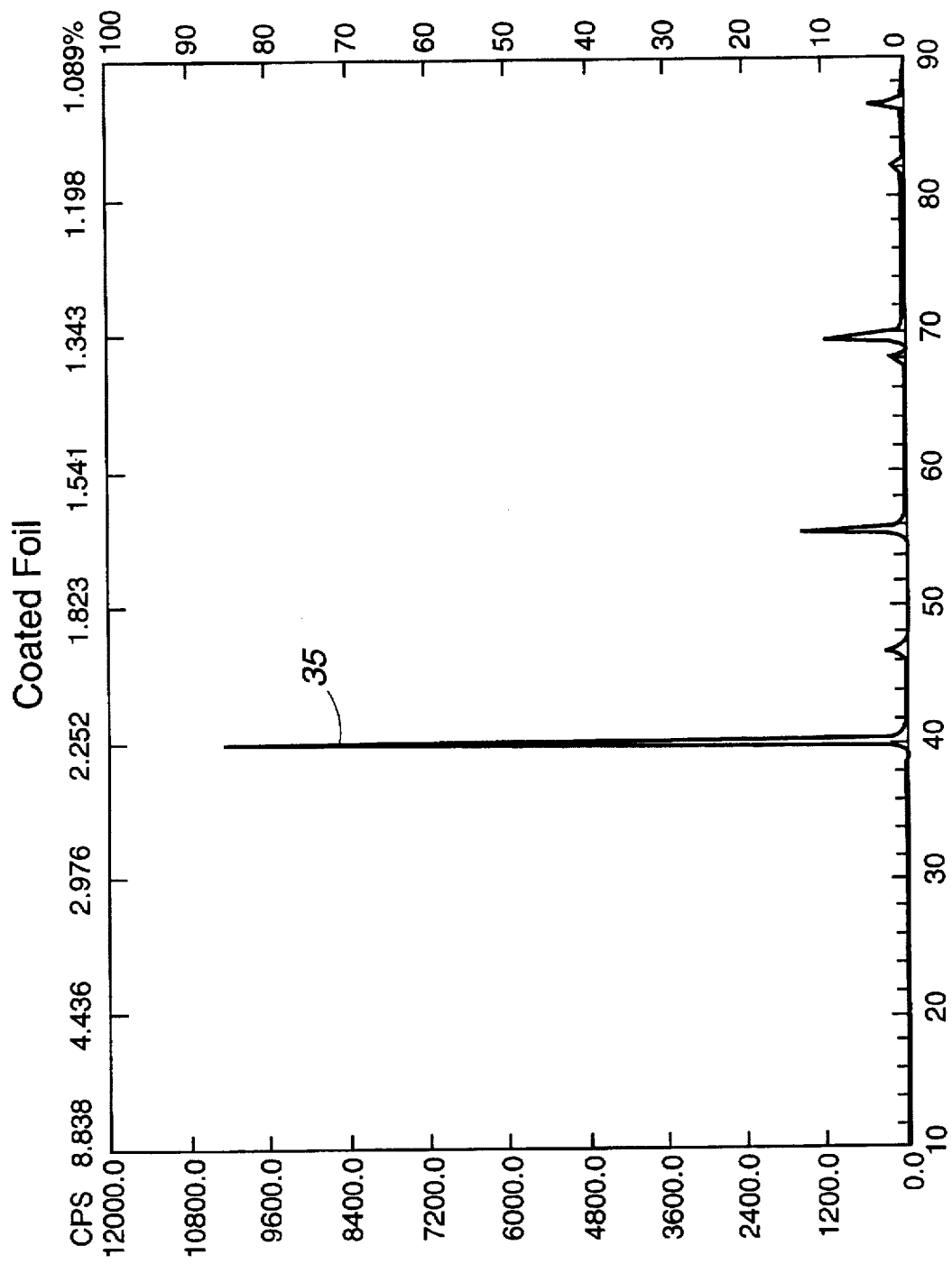
FIG. 3 shows a x-ray diffraction pattern of a palladium coated tantalum foil prepared in accordance with the present invention.

To investigate the structure of the refractory (central metal) and deposited metal layers, the x-ray diffraction of the tantalum foil was obtained prior to coating with palladium as shown in FIG. 2 wherein peak 25 is indicative of a (100) orientation. The composite structure was also investigated as shown in FIG. 3 wherein peak 35 is indicative of a (111) orientation and compared with that of the uncoated foil. Finally, the x-ray diffraction pattern of the composite metal membrane following usage as a hydrogen separator was obtained. The metal interfacial layers were studied using Rutherford backscattering (RBS) of singly charged 4.0 MeV He ions. Comparison of the membranes prior to and following usage helped to determine the extent of intermetallic diffusion at the metal/metal interface.

Crystallinity has often been ignored when considering high-temperature membranes due to reorientation and migration of grain boundaries which can occur at elevated temperatures. While there are annealing effects which will occur in the metals, these effects tend to improve the crystallinity rather than to degrade it. This was observed in the palladium film as the intensity of the (111) peak increased almost 5-fold after usage. Furthermore, the measured full-width-half-maxima (FWHM) for that peak decreased from 0.097° to 0.085° indicating that grain size also increased with usage.

Figure 4:
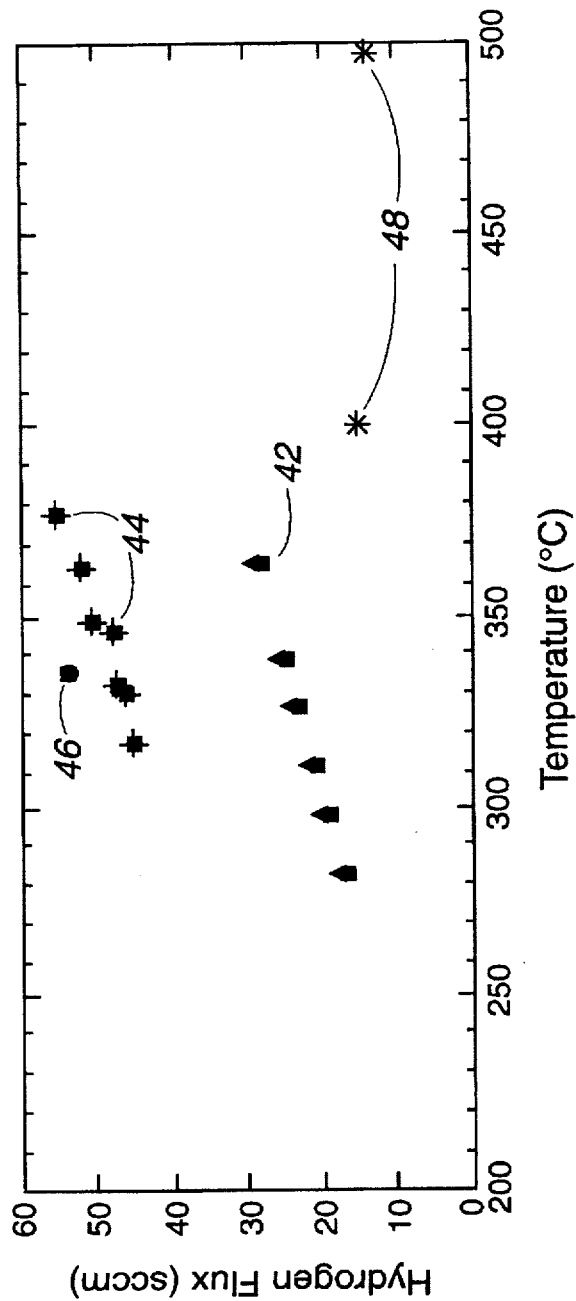
FIG. 4 shows a graph illustrating hydrogen flow (flux) data through the composite metal membranes of the present invention and for comparison through the composite metal membranes of Makrides et al.

Composite metal membranes prepared in accordance with Example 1 demonstrated high hydrogen fluxes. These high hydrogen fluxes, when scaled for temperature and pressure differences, exceeded those reported by Makrides et al., U.S. Pat. No. 3,350,845, Buxbaum et at., J. Membrane Sci., vol. 85, pp 29-38, and by Edlund, U.S. Pat. No. 5,393,325. The results are shown graphically in FIG. 4. It can be seen that the results from a 13 micron thick tantalum center with 1 micron thick oriented palladium layers (points 42), and that the results from both a 25 micron thick tantalum center with 0.5 micron thick oriented palladium layers (points 44) and a 100 micron thick tantalum center with 0.5 micron thick oriented palladium layers (point 46) provide excellent hydrogen fluxes. These results dramatically exceed the best results of Makrides et al. shown at points 48.

While not wishing to be bound by the present explanation, it is believed that the aspect of cleaning (by, e.g., ion beam milling) of the tantalum results in a better surface on which to deposit the palladium layer. Additionally, it is believed that the aspect of having the ion beam milling and the metal deposition both conducted under vacuum in the same chamber, i.e., with the tantalum not re-exposed to any oxygen, results in improvements in the quality of the tantalum layer and the deposited palladium layers. The vapor deposition of the palladium yields another aspect of the invention, i.e., oriented growth of the deposited metal. While the (111) orientation naturally grows from vapor deposition, ion beam assisted deposition can be used to control orientation and provide palladium layers oriented along other axes such as (110).

Although the present invention has been described with reference to specific details, it is not intended that such details should be regarded as limitations upon the scope of the invention, except as and to the extent that they are included in the accompanying claims.

What is claimed is:

1. A process for the recovery of hydrogen from a gaseous mixture comprising:

contacting a hydrogen-containing gaseous mixture with a first side of a nonporous composite metal membrane including a first metal layer selected from the group consisting of Group IVB metals and Group VB metals, said first metal layer sandwiched between two layers of an oriented metal selected from the group consisting of palladium, platinum and alloys thereof; and, separating hydrogen from a second side of said nonporous composite metal membrane.

2. The process of claim 1 wherein said contacting of said hydrogen-containing gaseous mixture with said composite metal membrane is at a pressure on a feed side of said membrane that is elevated relative to the pressure on a permeate side of said membrane.

3. The process of claim 1 wherein said two layers of oriented metal are continuous.

4. The process of claim 3 wherein said two layers of oriented metal have an orientation characterized as (111).

5. The process of claim 3 wherein said two layers of metal are from about 0.1 microns to about 25 microns in thickness.

6. The process of claim 5 wherein said metal layer selected from the group consisting of Group IVB metals and Group VB metals is from about 10 microns to about 250 microns in thickness.

7. The process of claim 1 wherein said layer of Group IVB or Group VB metal is oriented.

8. A composite metal membrane comprising a first metal layer selected from the group consisting of Group IVB metals and Group VB metals, said first metal layer sandwiched between two layers of an oriented metal selected from the group consisting of palladium, platinum and alloys thereof.

9. The membrane of claim 8 wherein said two layers of oriented metal selected from the group consisting of palladium, platinum and alloys thereof are continuous, nonporous layers from about 0.1 microns to about 25 microns in thickness.

10. The membrane of claim 9 wherein said two layers of oriented metal have an orientation characterized as (111).

11. The membrane of claim 9 wherein said metal layer selected from the group consisting of Group IVB metals and Group VB metals is from about 10 microns to about 250 microns in thickness.

12. The membrane of claim 8 wherein said layer of Group IVB or Group VB metal is oriented.

13. A process of forming a composite metal membrane comprising ion milling an oriented metal film selected from the group consisting of Group IVB metals and Group VB metals to remove surface oxides and surface imperfections from the oriented metal film; and, depositing layers of an oriented metal selected from the group consisting of palladium, platinum and alloys thereof upon the ion milled surfaces of said Group IVB or Group VB metal film.

14. The process of claim 13 wherein said ion milling and said depositing are conducted under vacuum in a single chamber and said vacuum is maintained throughout both said milling and said depositing.

* * * * *